May 2, 1961 R. PRICE ET AL 2,982,853

ANTI-MULTIPATH RECEIVING SYSTEM

Filed July 2, 1956 2 Sheets-Sheet 1

INVENTORS
ROBERT PRICE
PAUL E. GREEN JR.
BY
Edward D. Thomas
AGENT

ANTI-MULTIPATH RECEIVING SYSTEM

Filed July 2, 1956 2 Sheets-Sheet 2

INVENTORS
ROBERT PRICE
PAUL E. GREEN JR.
BY
Edward D. Thomas
AGENT

United States Patent Office 2,982,853

Patented May 2, 1961

2,982,853

ANTI-MULTIPATH RECEIVING SYSTEM

Robert Price, Fort Washington, Pa., and Paul E. Green, Jr., Weston, Mass., assignors, by mesne assignments, to Research Corporation, New York, N.Y., a corporation of New York Filed July 2, 1956, Ser. No. 595,531

3 Claims. (Cl. 250—20)

The present invention relates to an improved system for the communication of information in the presence of unpredictable disturbances. More particularly, it concerns a receiver to facilitate communication in the presence of noise and multipath effects.

Multipath is a characteristic of many communication systems, short wave radio and underwater sound being specific examples, in which a receiver is fed a succession of signals of various strengths arriving at various times over various paths. Sometimes it is impossible to resolve separate paths, and one seems to have a "continuum" of arrival times. In general, the strengths and delays of the various signals vary slowly in a random manner. Multipath effects are found to produce two types of difficulties associated with the different times of arrival of a signal propagated over paths of different lengths. In the first place, the time lapse between the first and the last of a succession of signals sets a lower limit on the duration of a single signal element; to send such elements any faster results in the simultaneous arrival over separate paths of contiguous elements, which are usually impossible to separate. In the second place, signals arriving over paths of different lengths are effectively displaced in phase and consequently interfere with one another resulting in some cases in complete cancellation. Generally, such multipath fading is frequency selective over a fairly narrow band of frequencies. By spreading the transmitted energy over a wide band of frequencies, fading around any one frequency will not cause as great a loss of received signal strength as with narrow-band transmission.

At present, most techniques for communicating through multipath can be described as "diversity" schemes to combat fading of narrow-band signals. Diversity schemes allow multipath induced fading of a received signal to exist, but by using several received signals, by means of receivers having different characteristics such as physical spacing, different frequency response or different polarization, whose outputs are combined in some fashion, the combined signal fades only when all receiver outputs fade.

In the present system, wide band signals are used so that a number of individual multipath signals can be resolved. At the receiver the signal arriving over each path is detected individually. All detected signals are then added after weighting by a fractor maximizing the signal to noise ratio of the sum. The object of weighting is to use in optimum fashion the signal received over each path. The above description of the separate detection, weighting and recombination of signals differing in time of arrival is fundamentally equivalent to doing the same thing in frequency. That is, the multipath produces at different frequencies regions of signal reinforcement and cancellation. The wide band technique described here has the effect of making greater use of the frequencies having greater response while attenuating the receiver response at others. Further, if the signals detected from each path are individually delayed by the proper amount, all signals can be made to arrive at the addition point at the same time. Then the propagation from transmitter to receiver output consists effectively of a single strong path rather than a succession of weaker paths. This feature eliminates the ambiguity between contiguous signal elements mentioned above.

The principal object of this invention is to provide a communication system for improved operation when the signal is propagated over multiple paths in travelling from the transmitter to the receiver in the presence of noise.

This and other objects of the invention will be better understood from the following description when taken in connection with the accompanying drawing wherein.

Figure 1:
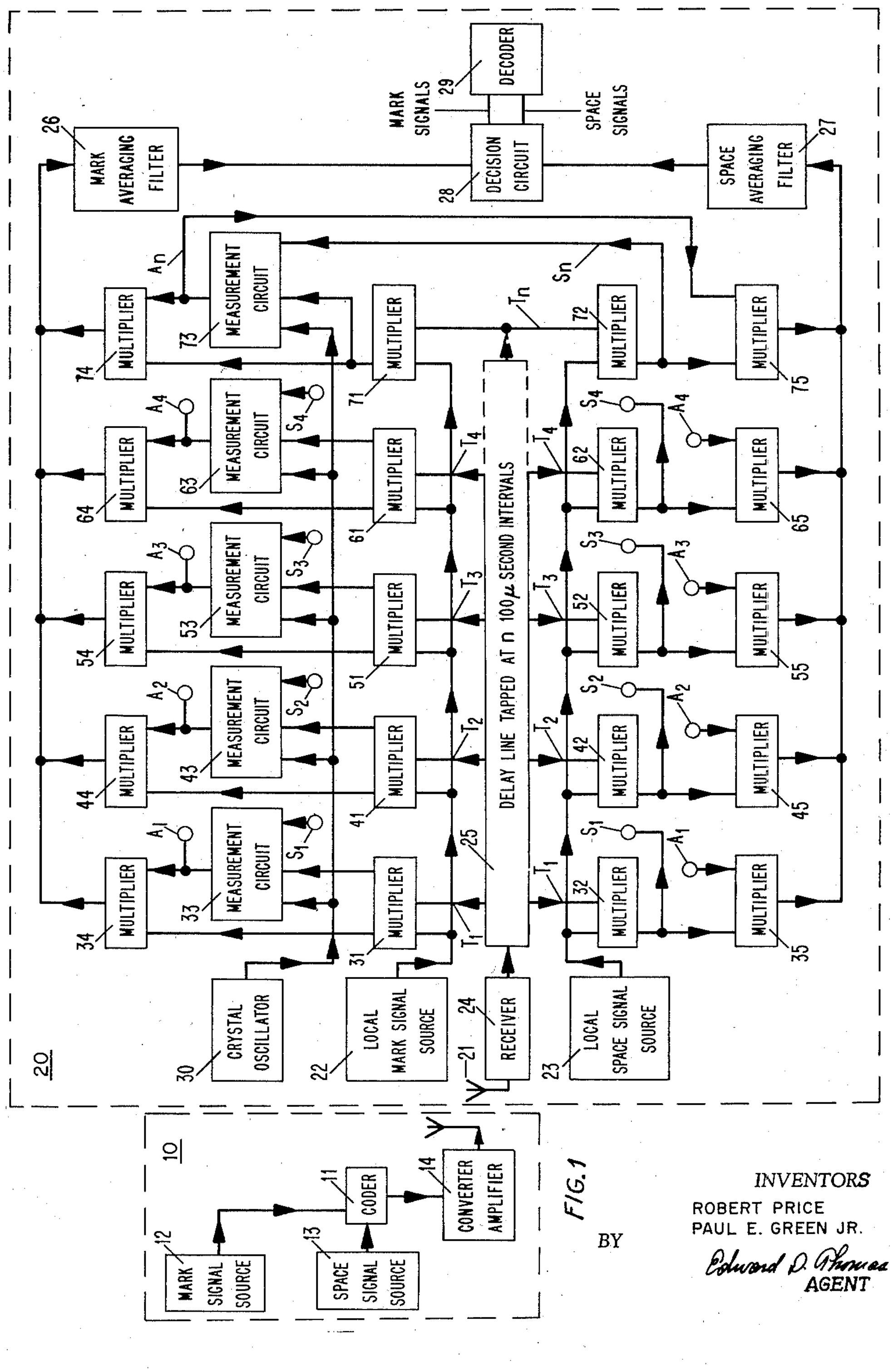
Figure 1 is a diagram in schematic block form illustrating a preferred embodiment of the invention.

By way of illustration, Figure 1 shows in general how the technique of the present invention is advantageously used in connection with a communication system of the type where information is coded in the binary system. In Figure 1 the transmitter, generally indicated at 10, sends either of two different wide band waveforms, representing mark signals or space signals respectively. Coder 11 selects signals from either mark signal source 12 or space signal source 13 to feed converter-amplifier 14 in accordance with some selected code and transmitter 10 sends continuously a mark or space waveform in coded sequence. The marks and spaces are segments of waveforms generated by sources 12 and 13, which waveforms have a repetition period equal to or longer than the length of a delay line to be described shortly.

At the receiver, generally indicated at 20, a mark signal source 22 and a space signal source 23 are provided to furnish local signals identical in waveform to those used by transmitter 10. These waveforms have a repetition period at least as great as the total delay of delay line 25. Signals picked up by antenna 21 are fed to radio frequency amplifier 24 which has sufficient gain to provide signals of adequate amplitude to overcome the attenuation inherent in subsequent stages. The output of radio frequency amplifier 24 is fed to delay line 25 which is tapped at $n$ equally spaced intervals, indicated in Figure 1 by conductors $T_1$, $T_2$, $T_3$, $T_4$, and $T_n$ respectively. The output of delay line 25 at $T_n$ is fed to multipliers 71 and 72. Mark signals from source 22 are also fed to multiplier 71 while space signals from source 23 are fed to multiplier 72. Assuming that the bandwidth of mark and space signals is W, then the averaged output of multipliers 71 and 72 will be significantly different from zero only for signals arriving from delay line 25 within $1/W$ seconds of the locally generated signals. Delay line 25 is, therefore, tapped at intervals of $1/W$, and the length of the delay line 25 is made at least as long as the multipath delay duration, D. $1/W$ must be made much smaller than D. Also, the timing of local mark and space signal sources is adjusted so that all significant arriving signals synchronize with the local signal sources somewhere along the delay line. The foregoing conditions hold true whether the signals arrive at the receiver over distinct resolvable paths or whether the signals appear to have a continuum of arrival times.

The output of mark multiplier 71 and the output of space multiplier 72 are both fed to "measurement" circuit 73 which functions to obtain the average signal strength made up of both mark and space signals. The output of mark multiplier 71 and measurement circuit 73 are combined in multiplier 74 to derive a mark signal which is weighted in accordance with the average delayed signal strength at tap $T_n$. In like manner multiplier 75 is fed by the outputs of multiplier 72 and measurement circuit 73 to derive weighted space signals. Therefore, the use of wideband signal waveforms, the measurement circuit, the multipliers and the delay line permits the reception of the transmitted signal arriving over one propagation path. The presence of signals, arriving over longer paths at various time delays, is detected at the several taps $T_1$, $T_2$, $T_3$, etc. by circuits identical to those described for tap $T_n$. The outputs of the several weighted mark signal multipliers, 34, 44, 54, 64---74, are fed to mark averaging filter 26 which performs the averaging of the sum of the weighted mark signal products. The outputs of the several weighted space signal multipliers, 35, 45, 55, 65---75 are fed to space averaging filter 27 which also derives the average sum of the weighted products.

The operation of multipliers 71 and 72 and averaging filters 26 and 27 can be considered to be a comparison between the waveform of the delayed signal and the mark and space waveforms respectively in a statistical sense; that is, by determining the correlation between the received signal and the local waveforms. It is well known that the correlation function between two time varying functions is defined by the expression:

$$\phi_{fg}(\tau)=\lim_{T\to\infty}\frac{1}{2T}\int_{-T}^{+T}f(t)g(t-\tau)dt$$

where $\tau$ is the time displacement between $f(t)$ and $g(t)$. In the foregoing equation $f(t)$ and $g(t)$ may be any functions of time. In a specific form of the equation, $g(t)$ is identical with $f(t)$ so that the correlation function becomes the so-called autocorrelation function given by:

$$\phi_{ff}(\tau)=\lim_{T\to\infty}\frac{1}{2T}\int_{-T}^{+T}f(t)f(t-\tau)dt$$

when the $f(t)$ and $g(t)$ functions are different, the correlation is termed cross-correlation. In any case, the correlation is a function of $\tau$ since $t$ is eliminated by the integration.

It is likewise well known that the cross-correlation function of two sufficiently different waveforms will possess a comparatively low value for all values of $\tau$, whereas the auto-correlation function will be a maximum when the time displacement between the two functions is zero. Hence multiplier 71, or 72, is effectively multiplying the delayed signal by the mark or space waveform respectively, the relative time displacement being provided by delay line 25. The integrating or averaging operation is effectively performed by the averaging filter 26 (or 27 respectively). A mark multiplier will deliver a low output signal from the averaging filter 26 when fed a delayed space waveform regardless of the delay line tap to which it is connected, the cross-correlation function between mark and space waveforms being low. On the other hand, a mark multiplier will deliver a high output signal from the averaging filter 26 when fed a delayed mark waveform from a delay line tap affording a comparatively small time displacement, the reciprocal of the signal bandwidth—$1/W$ seconds in this case, between the local mark waveform and the delayed mark waveform, while all other mark multipliers will display a low output corresponding to auto-correlation function values for substantial time displacements between local and delayed waveforms.

It will be noted from Figure 1 that, to save components, one averaging filter (26 or 27) is used to average a sum of all the multiplier outputs, rather than summing the outputs of a number of averaging filters. Since the sum of averages equals the average of a sum, the two procedures are equivalent.

The process of time realignment of the detected signals is taken care of automatically in this circuit. The signals arriving earlier travel farther down the delay line before reaching a tap where the averaged product operation yields an output and the later arriving signals synchronize nearer the delay line input. This works out so that the weighted products all arrive at the averaging filter simultaneously. For example, if the transmitter sends a mark signal followed by a space signal, although the mark-space transition arrives at the receiver smeared in time by the multipath delays, as far as the two averaging filter inputs are concerned, the input voltage at the mark averaging filter 26 drops to zero at the same time that the input voltage at the space averaging filter 27 starts to rise.

The decision circuit 28 is fed the outputs of mark averaging filter 26 and space averaging filter 27 and is responsive to their difference at any given instant to furnish either a mark signal pulse or a space signal pulse for further utilization, such as by decoder 29.

Further by way of illustration, it may be supposed that local mark signal source 22 and space signal source 23 generate their respective waveforms at a center frequency of $f_1$ while the received signal arrives at delay line 25 at a center frequency of $f_0$. In the event that the converter-amplifier 14 is operated so that transmitter 10 radiates at a center frequency other than $f_0$, it will be understood that radio frequency amplifier 24 includes a local oscillator heterodyning with the received signal to supply an intermediate frequency output at the specified $f_0$.

Figure 2:
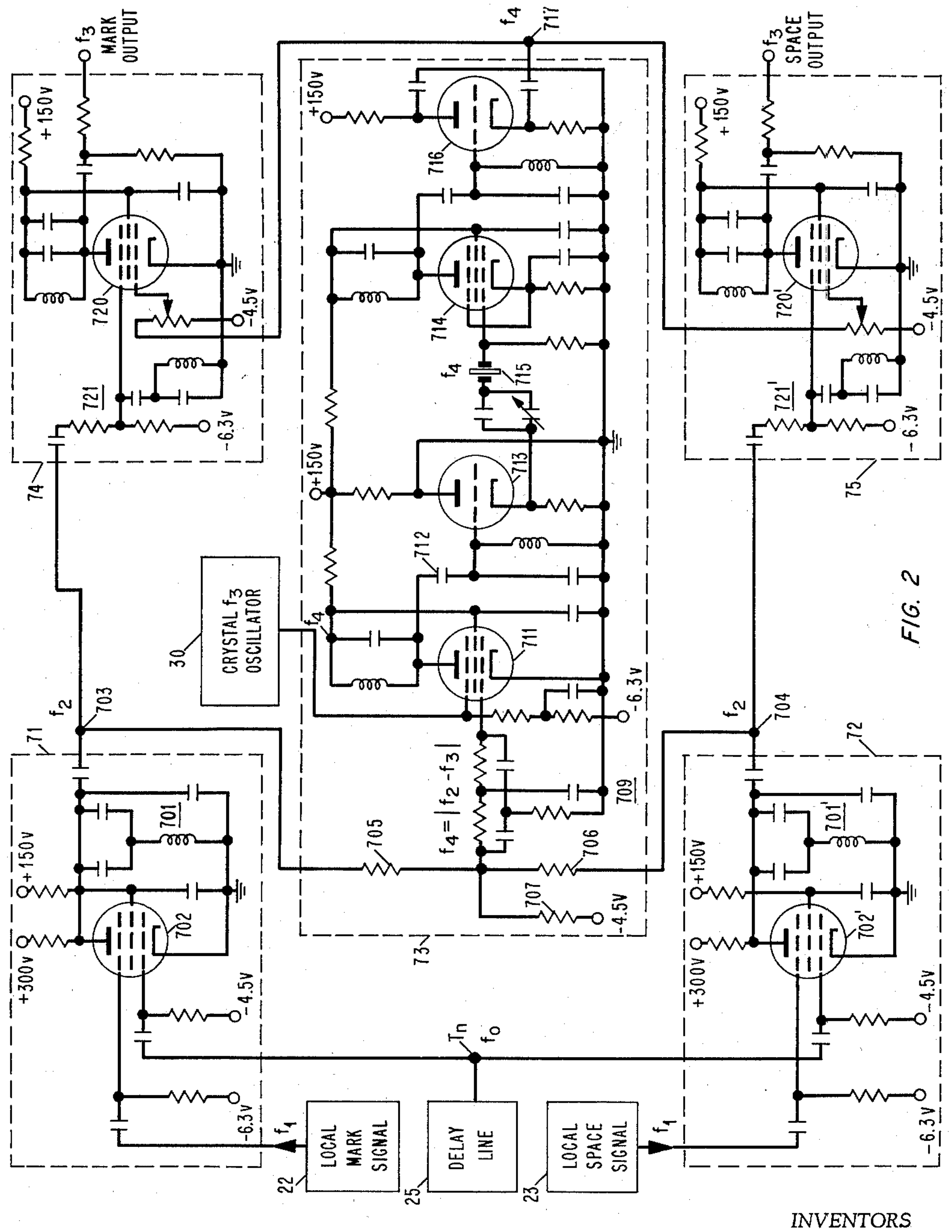
Figure 2 is a circuit diagram showing in greater detail the circuit shown in block form in Figure 1 with some of the blocks omitted.

Referring to Figure 2, the circuit details correspond to the elements shown in block form in Figure 1 responsive to the signal appearing at a given tap, say $T_n$, of delay line 25 and furnishing weighted mark output signals and weighted space output signals. A common ground connection, not shown in Figure 1, is conventionally shown in Figure 2. The parts corresponding to the blocks in Figure 1 are shown in dotted lines in Figure 2. No voltage supply is shown, but a well regulated supply furnishing the indicated voltages with respect to ground is recommended. In view of the completeness of the detail given by Figure 2, only a brief description of the circuit follows.

The signal appearing at tap $T_n$ of delay line 25 is fed to the inputs of multipliers 71 and 72. The delayed $f_0$ signal and the output of local mark signal source 22 are applied to separate grids of pentode mixer tube 702, the plate circuit of which is tuned to $f_2=|f_0-f_1|$. Mixer tube 702 is seen to multiply the $f_0$ delay line output with the $f_1$ local mark signal to form a $f_2$ difference frequency mark signal at point 703. It is the amplitude of the $f_2$ signal that drops substantially to zero if the time displacement between the local signal and the incoming signal differs by more than $1/W$ seconds. In like manner, the local space signal and the amplified $f_0$ signal are combined in multiplier 72 to form a $f_2$ difference frequency space signal at point 704.

The $f_2$ mark signal at point 703 and the $f_2$ space signal at point 704 are added in a resistance network formed by resistors 705, 706, and 707 to present at the input of filter 709 a continuously present $f_2$ signal, regardless of mark-space keying, giving the instantaneous amplitude of the signal detected at the output of tap $T_n$ of delay line 25. The added mark and space $f_2$ signal is coupled through a simple resistance capacitance bridged T filter 709 to pentode mixer tube 711. The $f_3$ output of crystal oscillator 30 is also applied to mixer tube 711, the plate circuit of which is tuned to $f_4=|f_2-f_3|$. The $f_4$ output signal of mixer 711 is coupled by capaciter 712 to the tuned grid circuit of triode cathode follower 713. The output of cathode follower 713 is coupled to the control grid of pentode amplifier 714 by means of crystal 715 which is tuned to $f_4$ and serves as a highly selective narrow band filter. The output of amplifier 714 and the input to triode cathode follower 716 are also tuned to $f_4$. The effect of the crystal and tuned circuits is to present at point 717 an $f_4$ voltage having an amplitude which represents the desired weighting; that is, the value of path strength averaged over as long a time as the rate of fluctuations of this path strength will allow. The band width of the overall $f_4$ filter is adjusted so as to accommodate this rate of fluctuation.

The next stage represents the multiplication of the $f_2$ mark and space signals by the $f_4$ weighted coefficient voltage to form a $f_3$ weighted product voltage. The $f_2$ mark signal at point 703 is applied to the $f_2$-tuned grid circuit of pentode tube 720 and the weighted $f_4$ voltage at point 717 is fed to the control grid of mixer tube 720. The output circuit of tube 720 is tuned to $f_3$. In like manner, $f_2$ space signals and the weighted $f_4$ voltage at point 717 are multiplied in tube 720′. Thus the outputs of multipliers 74 and 75 are seen to be $f_3$ mark and space signals respectively weighted by the average strength of the signal arriving over the particular path selected by delay line tap $T_n$.

It will be noted that the signals present at delay line taps $T_1$, $T_2$, $T_3$, $T_4$, etc. are applied to detecting circuits identical to the one described above for tap $T_n$. The several $f_3$ weighted product voltages from the several delay line taps are assured of adding in phase at the inputs of the averaging filters 26 and 27 by the common $f_3$ oscillator supply for all of the "average" circuits of Figure 1.

In the output of multiplier tube 702 there are, in addition to the desired $f_2$ product, other undesired spectral components that must be suppressed. The most harmful of these lie at $|f_3-f_4|$, $f_3$ and $f_4$. The presence of any $|f_3-f_4|$ components in the signal at point 703 can produce a spurious $f_4$ signal at the plate of tube 711 and a spurious $f_3$ signal at the plate of tube 720. Consequently, plate circuit 701 is tuned to parallel resonance at $f_2$ to favor the desired $f_2$ signal and to series resonance at $|f_3-f_4|$ shunting any such component to ground. In a similar manner, and $f_3$ component at point 703 is shunted to ground by the series resonance of tuned circuit 721 at $f_3$; otherwise, a $f_3$ component could feed directly through tube 720. Finally, a $f_4$ component at point 703 could feed directly through tube 711 into the $f_4$ crystal filter unless suppressed by means of bridged-T filter 709. Obviously, the same considerations apply to space signal multipliers 72 and 75.

The mark averaging filter 26 and space averaging filter 27 are conventional bandpass filters tuned to $f_3$, such as are commonly employed in radio teletype systems. The decision circuit 28 may also be of the sort used in such systems and commonly includes a conventional envelope detector for the output of the mark averaging filter and a second envelope detector for the output of the space averaging filter followed by a threshold circuit operating on the difference of the mark and space envelopes. Typically, a binary output is developed; for example, positive for mark envelope greater than space envelope and negativet if vice versa. Since the present invention is limited to those circuits which act to produce the summation of the weighted mark signals and the summation of the weighted space signals, it is thought to be unnecessary to include circuit diagrams of these conventional circuit elements and the details of the utilization circuit, such as decoder 29.

Although the foregoing description has assumed that the transmitter radiates continuously a coded sequence of mark and space waveforms, it will be understood that the message to be transmitted could be coded from a larger set of waveforms. For example, each letter of the alphabet could represented by one arbitrary waveform from a set of twenty-six. The same set of waveforms would be made available at the receiver. When the transmitted waveforms are received, they are compared to the local waveforms and, by selecting the local waveform corresponding to the received waveform in the manner described above, the waveform sent by the transmitter is determined and the message decoded. However, such a system would be much more complex. It is also clear that the system will operate equally well if the transmitter radiates a distinctive waveform only for mark signals and does not radiate during time intervals representing spaces. Further, the transmitted mark and space waveforms may differ in frequency as in the well-known frequency shift keying form of radio teletype communication.

It being understood that the specific embodiment of the invention shown and described is illustrative only, various modifications may be made therein without departing from the scope and spirit of this invention as set forth in the appended claims.

What is claimed is:

1. In a communication system transmitting signals having a frequency bandwidth W wherein ionospheric multipath propagation produces a plurality of received signals having different times of arrival, the elapsed time between the first and last of said signals being equal to D, a receiver comprising, a delay line presenting a total delay time at least as great as D and having a plurality of taps spaced at equal intervals corresponding to $1/W$, means coupling the signals arriving at said receiver to said delay line, a local source of signals identical in waveform to those used by said transmitter, a plurality of detectors, one for each of said delay line taps and fed by the delayed signals thereat and by said local signal source and operative to produce a significant output for time displacements between said local signal and said delayed signal less than $1/W$ seconds, whereby the output of all detectors occur at substantially the same instant of time, a plurality of measuring circuits, one for each of said delay line taps and responsive to the detected output thereof to derive an output voltage proportional to the average signal strength at the arrival times corresponding to said delay line tap, means to combine each of said measuring circuit outputs with the output of the detector feeding a signal thereto to modify each of said detector outputs in proportion to its average signal strength to produce a weighted detector output for each detector, and averaging means responsive to said delayed weighted outputs of said plurality of detectors to obtain a weighted summation output signal corresponding to the total signal energy reaching said receiver.

2. A radio communication system, wherein the propagation characteristics between transmitter and receiver produce a plurality of signal paths of differing lengths feeding said receiver a succession of signals arriving at various times, including a transmitter continuously radiating a coded sequence of segments of different wide band waveforms each corresponding to a predetermined symbol, the repetition period of each of said waveforms being longer than the time lapse between the first and the last of said succession of signals, and a receiver, said receiver comprising, a local source of waveforms identical to and synchronized relative to those used by said transmitter, a delay line tapped at equally spaced intervals and presenting a total delay time at least equal to the time lapse between the first and the last of said succession of signals, means coupling the signals arriving at said receiver to said delay line, a first plurality of multipliers connected so that at each tap of said delay line each local waveform is separately multiplied by the delayed signal thereat, each of said multipliers being operative to produce an output signal when the waveform of said delayed signal corresponds to said local waveform with a time displacement less than the time interval between said delay line taps, a measurement circuit for each of said delay line taps, each of said measurement circuits being coupled to the outputs of the multipliers fed by a common delay line tap to derive an output voltage proportional to the average signal strength at the delay corresponding to said tap, a second plurality of multipliers, one for each of said first plurality of multipliers and responsive to the output thereof and to the output voltage of the measurement circuit connected therewith to weight said first multiplier output in proportion to the average signal strength fed to said first multiplier by said delay line, an averaging filter for each symbol represented by a predetermined local waveform, each of said averaging filters being fed by the weighted outputs derived from multipliers responsive to the local waveform corresponding to the symbol represented by said averaging filter to produce a weighted summation output, an envelope detector for each of said averaging filters, and means for comparing the outputs of said envelope detectors to determine the coded sequence of symbols corresponding to the sequence of waveforms radiated by said transmitter.

3. A radio communication system, wherein the propagation characteristics between transmitter and receiver produce a plurality of signal paths of differing lengths feeding said receiver a succession of signals arriving at various times, including a transmitter continuously radiating a sequence of segments of different mark and space wide band waveforms selected in accordance with a predetermined code, the repetition period of each of said waveforms being longer than the time lapse between the first and the last of said succession of signals, and a receiver, said receiver comprising, a local source of mark and space waveforms identical to and synchronized relative to those used by said transmitter, a delay line tapped at equally spaced intervals and presenting a total delay time at least equal to the time lapse between the first and the last of said succession of signals, means coupling the signals arriving at said receiver to said delay line, a first plurality of multipliers connected so that at each tap of said delay line said local mark waveform and said local space waveform is separately multiplied by the delayed signal thereat, each of said multipliers being operative to produce an output signal when the waveform of said delayed signal corresponds to said local waveform with a time displacement less than the time interval between said delay line taps, a measurement circuit for each of said delay line taps, each of said measurement circuits being coupled to the outputs of the multipliers fed by a common delay line tap to derive an output voltage proportional to the average signal strength at said tap, a second plurality of multipliers, one for each of said first plurality of multipliers and responsive to the output thereof and to the output voltage of the measurement circuit connected therewith to weight said first multiplier output in proportion to the average signal strength fed to said first multiplier by said delay line, a mark averaging filter and a space averaging filter, each of said averaging filters being fed by the weighted outputs derived from multipliers responsive to the local waveform corresponding to the symbol represented by said averaging filter to produce a weighted summation output, an envelope detector for each of said averaging filters, and means for comparing the outputs of said envelope detectors to determine the coded mark and space sequence radiated by said transmitter.

References Cited in the file of this patent

UNITED STATES PATENTS

| | | |
|---|---|---|
| 1,900,283 | Hammond | Mar. 7, 1933 |
| 2,227,057 | Blumlein | Dec. 31, 1940 |
| 2,236,134 | Gloess | Mar. 25, 1941 |
| 2,349,407 | Crosby | May 23, 1944 |
| 2,426,187 | Earp | Aug. 26, 1947 |
| 2,494,309 | Peterson et al. | Jan. 10, 1950 |
| 2,505,266 | Villem | Apr. 25, 1950 |
| 2,521,696 | De Armond | Sept. 12, 1950 |
| 2,629,816 | Rabuteau | Feb. 24, 1953 |
| 2,786,133 | Dyke | Mar. 19, 1957 |
| 2,800,654 | De Rosa | July 23, 1957 |